March 17, 1936. L. G. PLANT 2,034,418
METHOD OF FABRICATING WROUGHT METAL GATE VALVES
Filed Feb. 6, 1932 10 Sheets-Sheet 2

INVENTOR:
Leland G. Plant,

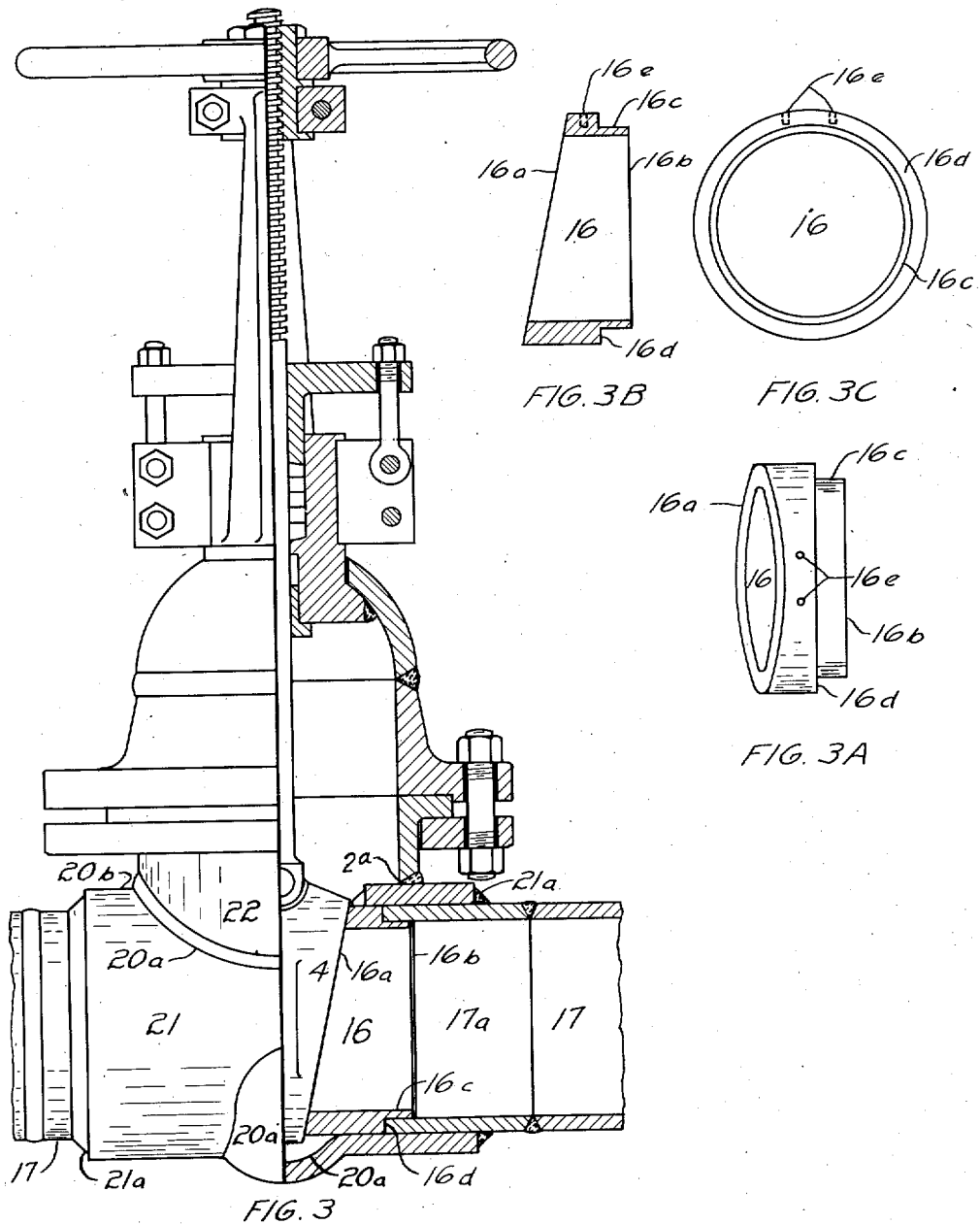

March 17, 1936. L. G. PLANT 2,034,418
METHOD OF FABRICATING WROUGHT METAL GATE VALVES
Filed Feb. 6, 1932 10 Sheets-Sheet 4
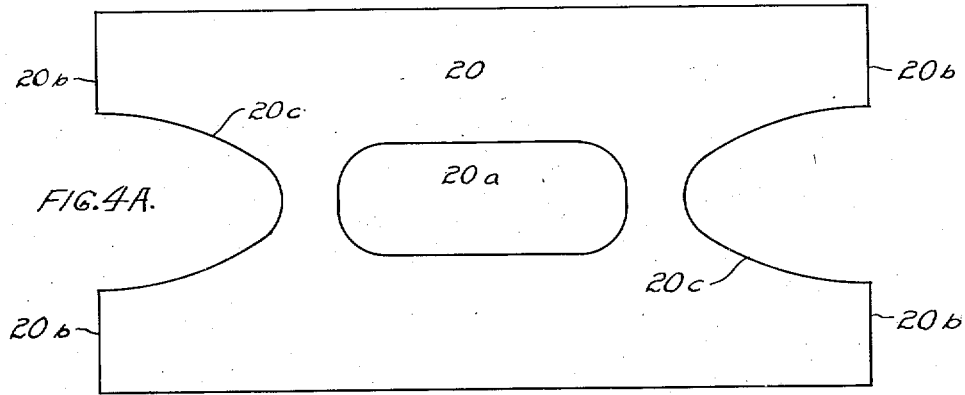
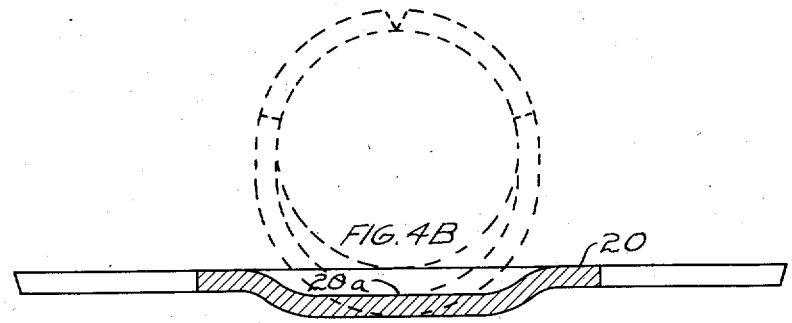
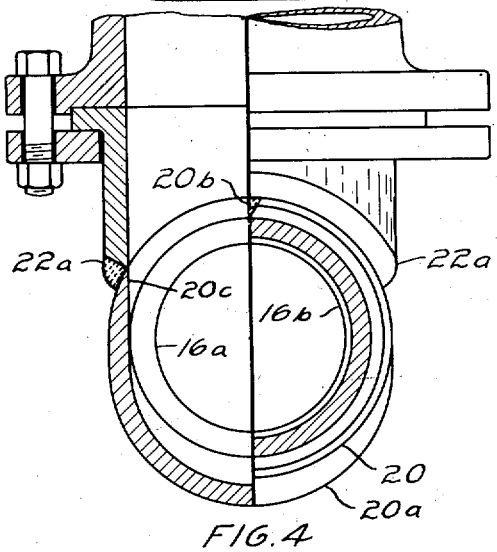
INVENTOR:
Leland G. Plant,
BY
Wilkinson, Huxley, Byron & Knight,
ATTORNEYS.
WITNESS
W. H. Jury

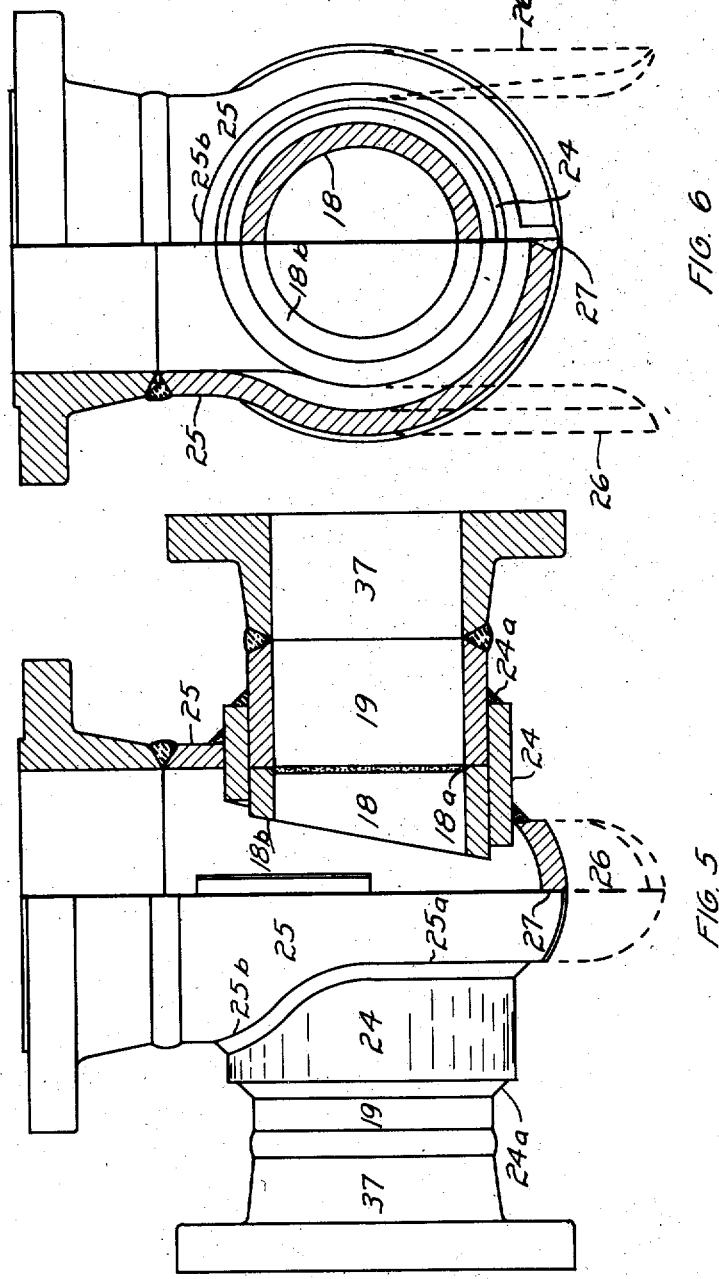

March 17, 1936.   L. G. PLANT   2,034,418
METHOD OF FABRICATING WROUGHT METAL GATE VALVES
Filed Feb. 6, 1932   10 Sheets—Sheet 6

INVENTOR:
Leland G. Plant,
BY *Wilkinson, Huxley, Byron & Knight*
ATTORNEYS.

WITNESS
W. H. Jury

March 17, 1936. L. G. PLANT 2,034,418
METHOD OF FABRICATING WROUGHT METAL GATE VALVES
Filed Feb. 6, 1932 10 Sheets-Sheet 7
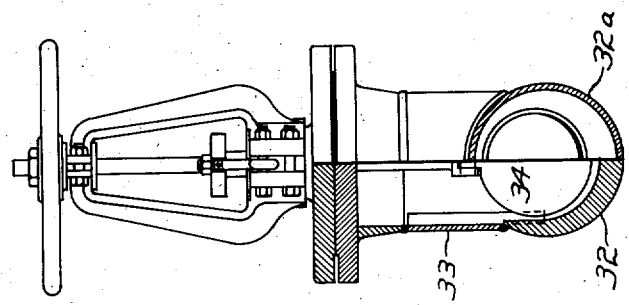
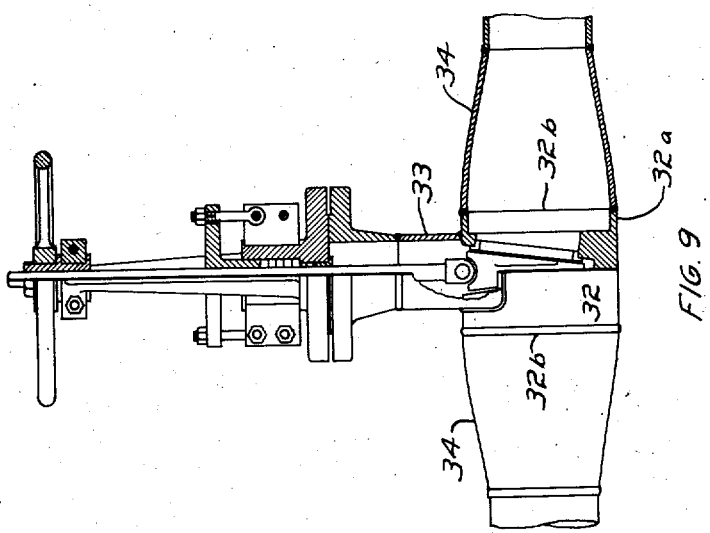
INVENTOR:
Leland G. Plant,
BY
ATTORNEYS.

March 17, 1936.　　　　L. G. PLANT　　　　2,034,418
METHOD OF FABRICATING WROUGHT METAL GATE VALVES
Filed Feb. 6, 1932　　　10 Sheets-Sheet 8
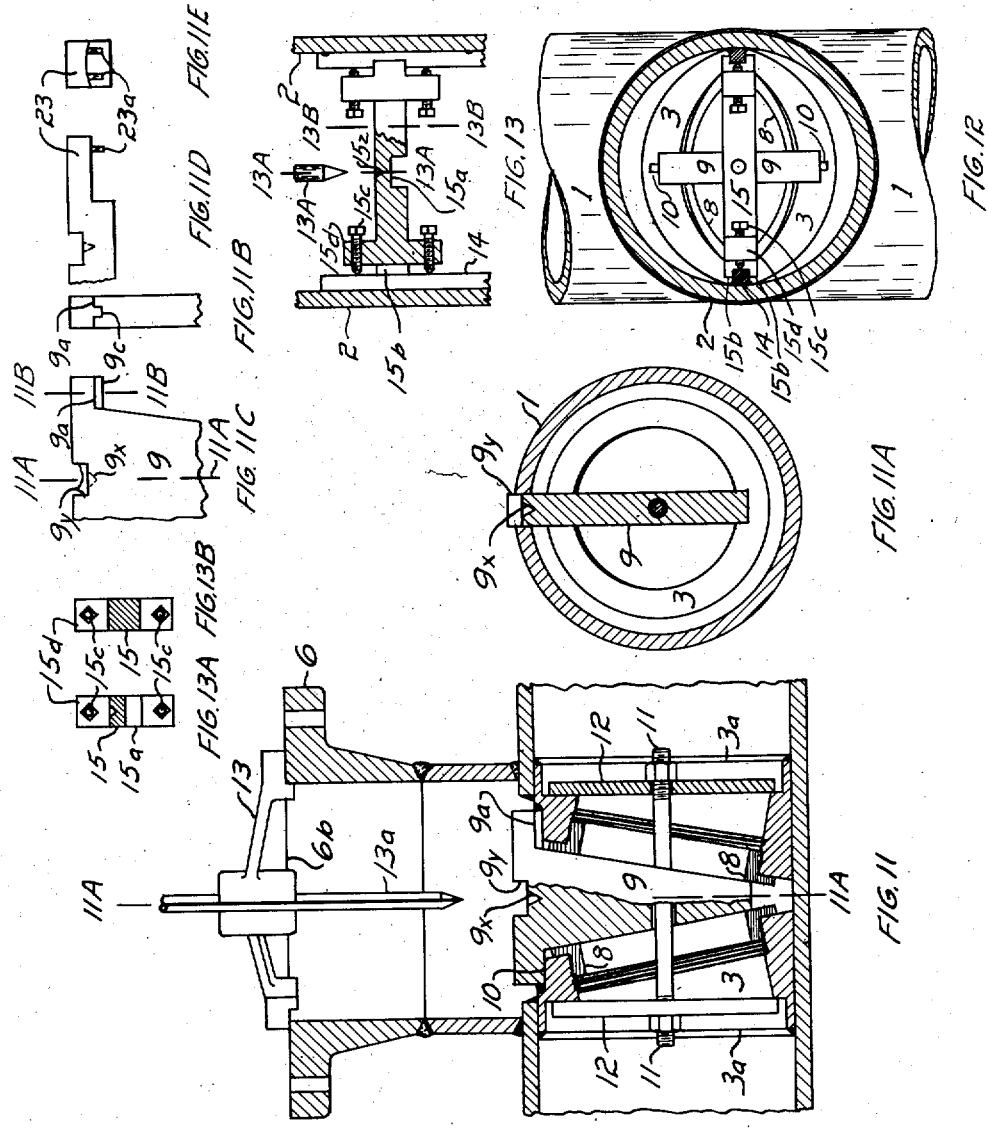
INVENTOR:
Leland G. Plant,
BY
Wilkinson, Huxley, Byron & Knight
ATTORNEYS.
WITNESS
W.H. Jury

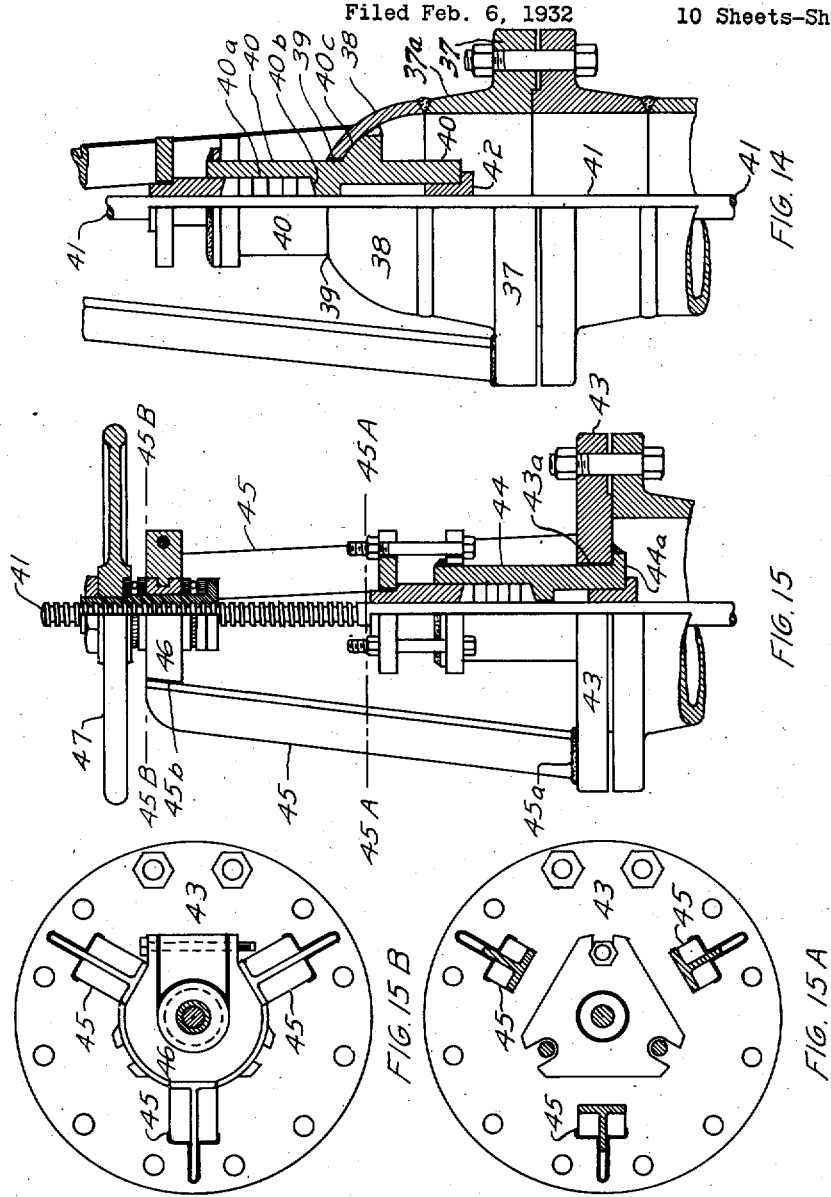

March 17, 1936.  L. G. PLANT  2,034,418
METHOD OF FABRICATING WROUGHT METAL GATE VALVES
Filed Feb. 6, 1932   10 Sheets-Sheet 10

WITNESS
W. H. Jury

INVENTOR
Leland G. Plant
BY Wilkinson, Huxley, Byron & Knight
ATTORNEYS

Patented Mar. 17, 1936

2,034,418

UNITED STATES PATENT OFFICE 2,034,418

METHOD OF FABRICATING WROUGHT METAL GATE VALVES

Leland G. Plant, Chicago, Ill.

Application February 6, 1932, Serial No. 591,377

11 Claims. (Cl. 29—157.1)

This invention relates to the construction of valves of the well known gate type, functioning similarly to gate valves heretofore known and used but involving novelty in the method of their production as well as in their structural organization when produced.

The so-called gate valve is that type which, when open, affords a straight-way passage for liquids or gases therethrough (the minimum area of this passageway being approximately that of a circle having a diameter equal to the rated size of valve) and which depends for closure upon wedging a tapered gate between two opposed ports whose faces are inclined to each other at an angle corresponding to the taper of said gate. The opposed ports in this type of valve are ordinarily disposed about axes in a plane parallel to the intended direction of flow through the valve and when the aforesaid gate is withdrawn therefrom, these ports present a clear opening for liquid or gaseous flow through the body of the valve in stream lines approximately parallel to the axis of the duct in which the valve is inserted. In addition to the parts above mentioned, valves of this type include a stem and mechanism, usually of the screw type, for inserting the tapered gate as a wedge between the opposed ports in the body of the valve and for withdrawing this gate to a recess in the valve body, out of the path of flow through the valve.

Various forms of construction have been employed in making valves of the gate type above described. The usual method is to cast the body of the valve. This body casting comprises an inlet and an outlet adapted for connection to the duct in line of which the valve is inserted. Within this body casting are the opposed ports above referred to, between which a tapered gate may at will be wedged to block the flow of fluid through the duct. These inner ports are cast integral with the valve body but are often faced with an alloyed metal of special composition to afford a more perfect contact with the tapered gate when wedged between said ports, also to reduce wear and abrasion upon the faces of these ports when uncovered. If the cast ports are thus formed, the usual means employed is to machine rings of forged alloy steel and screw one of these rings into each port, the inner bore of the port having been threaded to receive said ring. This cast valve body must have a recess into which the tapered gate can be withdrawn clear of the opposed ports when they are opened to allow free fluid flow therethrough. It is also essential in valves of this type to have a removable cap (usually called a bonnet) to said recess by removal of which the said tapered gate can be inserted when assembling the valve or later removed for inspection or repair. This cap or bonnet is usually a casting of the same material as the body of the valve to which it is bolted. At the center or apex of this cap member there is a bore to accomodate the valve stem by means of which said gate can be inserted or withdrawn from between the valve ports by manipulation outside the valve body. This bore is enlarged to form a packing box which, together with a packing gland surrounding the valve stem prevents escape through said bore of fluid from within the valve body. The valve stem is ordinarily threaded at one end to engage either the gate inside the valve body or to engage a collar set in a yoke outside the valve body so that with either arrangement, the gate can be wedged between the aforesaid valve ports or withdrawn therefrom by rotating said stem or collar by a hand wheel or other effective means.

Valve bodies as described are cast in bronze, iron, steel or other metals and combinations thereof. There is no size limitation to this construction but where the valve is intended for controlling high fluid pressures or temperatures, or both, the general practice is to employ a cast steel body. Such steel body castings can be made as large and strong as necessary to meet any modern requirement, but in the present state of this art, the time required and expense involved in casting steel for this purpose represents the major element in the total cost of manufacturing these valves. This applies to an increasing extent as the fluid pressure for which the valve is designed becomes greater and as the size of the body is enlarged. The pattern cost represents an initial expense in the cost of making valves with cast bodies. The cost of molding, of preparing the molten metal and of pouring this metal into the mold contributes further to this expense; and where the casting is of steel, the subsequent cost and time required to thoroughly anneal these castings has been found to be a large and unavoidable item in the expense of manufacturing these valves. Finally, there is the cost of machining these castings preliminary to applying alloyed steel trim and of threading or facing the flanges to which said bonnet and the connecting ducts are bolted. To these costs must be added the large overhead charge attributable to an investment in foundry equipment and an incidental charge occasioned by a percentage of imperfect steel castings produced in the course of manufacture.

Some items above enumerated in the cost of manufacturing valves, particularly the annealing operation, do not apply if the bodies are made of cast iron instead of steel; but, on the other hand, it has recently been recognized that cast iron valve bodies are not safe for use in valving fluids at high temperatures, such as superheated steam, owing to the deteriorating effect of these temperatures upon cast iron. Also, cast iron bodies must be made extremely heavy to withstand high fluid pressures within the valve, and for the highest pressures encountered in practice nothing short of a steel body casting will suffice. The use of cast bronze bodies is common in the manufacture of gate valves of the smaller sizes and obviates some items of manufacturing expense encountered in the use of cast steel. But, on the other hand, the cost of the bronze itself is higher and this metal has not the requisite structural strength for large valves capable of controlling fluids flowing under high pressures and temperatures. Another limitation to valves with cast iron or bronze bodies is their inability to be welded to the duct in which the valve is inserted. This does not apply to valves with cast steel or forged steel bodies which can be provided with tips in place of flanged or threaded couplings for welding to the duct in line of which the valve is inserted. These welding tips may be simply projecting inlet and outlet ports cast in the valve body with beveled edges to contact with and be welded to the beveled ends of the duct in the line of which the valve is inserted. This is a feature of growing importance as the art and practice of assembling pipe ducts by welding is now developing by leaps and bounds.

Turning to the alternative of valves with forged steel bodies intended for controlling the flow of fluids under high pressures and temperatures, we find that while forged steel is preferable to cast metal in respect to its strength, density of structure and freedom from warpage, its use in the construction of gate valve bodies has in actual practice to this date been severely restricted by well nigh insurmountable manufacturing obstacles except in the relatively smaller sizes of valves, say, six inches and under. To duplicate the usual form of a cast steel bodied gate valve in a forged steel body requires an elaborate equipment of forging dies for each size of valve to be manufactured, followed by a difficult machining operation involving the wastage of much surplus metal from the original forging. The practical difficulties to forging out the body of a gate valve in the conventional design, say, twelve inch size or larger, would in the present state of the art virtually prohibit this form of manufacture as a commercial enterprise.

I have devised a construction and method for manufacturing valves of the type under consideration which, considered as a whole in the light of its effect upon valve design, is revolutionary since it serves to bring gate valve body construction entirely from wrought steel within the realm of commercial practicability by reducing the expenditure of labor and materials involved to a level comparable, if not substantially under the cost of valves of the same type, size and strength constructed with cast steel bodies.

My method of constructing valves of the type under consideration proceeds upon the principle of utilizing cylindrical shells of wrought steel readily obtainable in the form of seamless tubing or steel plates rolled into a cylindrical form and welded along their abutting edges. I also avail myself of forged steel flanges now commercially obtainable with necks adaptable for welding to an abutting pipe cylinder and of tapered wrought pipe cylinders now manufactured under the common designation "swaged nipples"; also of wrought pipe caps designated commercially as "bull plugs", all of which are obtainable with beveled edges for welding to an abutting flange neck or pipe. The only forgings required to complete the construction of a gate valve by my method are each relatively small in relation to the completed valve body and, being of a symmetrical, cylindrical form, present no difficulties in their forging and are easy to machine. To complete the construction of valves of the type to which my invention relates, a valve stem with packing gland, screw and yoke mechanism, hand wheel and trim common to other gate valves may be manufactured and applied in the usual way, or especially built up in accordance with one feature of the present invention.

In order that my invention may be fully understood, I will now describe a typical procedure by which to produce valves of the type to which the invention applies, as well as several typical valve structures produced by said procedure, or variations thereof, within the scope of the invention, reference being had to the drawings forming part of this specification.

In said drawings—

Figures 3 and 4 are views similar to Figures 1 and 2 of another construction produced in accordance with the invention.

Figures 3A, 3B and 3C are, respectively, a plan view, an axial section, and an end view of one of the two opposed port-forming cylinders employed in Figures 3 and 4.

Figures 4A and 4B are, respectively, a plan and a middle longitudinal section of a plate which, after blanking and recessing, is rolled into cylindrical form to produce the valve-body cylinder employed in Figures 3 and 4.

Figures 5 and 6 are, respectively, a side and an end elevation, partly in section, showing a modfied construction of valve produced in accordance with the invention.

Figures 9 and 10 are, respectively, a side and an end elevation, partly in section, showing still another valve constructed in accordance with the invention.

Figure 11 is a vertical axial sectional view of the valve body of Figures 1 and 2, with positioning templates for locating and aligning the opposed port-forming cylinders.

Figures 11A and 11B are sectional views taken, respectively, on the line 11A—11A and 11B—11B of Figures 11 and 11C.

Figure 11C is a detail elevation of a portion of the template block, viewed from the right of Figure 11.

Figures 11D and 11E are detail views showing a portion of a template such as illustrated in Figure 11C, modified to adapt it for use in connection with port-forming cylinders like the one shown in Figures 3A, 3B and 3C.

Figure 12 is a horizontal sectional view of the valve body of Figures 1 and 2, showing in plan the templates employed for positioning both the port-forming cylinders and the gate-guiding rails.

Figure 13 is an elevation, partly in section, of the template and a contiguous portion of the valve body of Figure 12.

Figures 13A and 13B are views, in section, on the line 13A—13A, 13B—13B, respectively, of Figure 13.

Figure 14 is a sectional elevation of a built-up stem guide modified to adapt it for application to valves having domed gate-recess caps such, for instance, as shown in Figures 3 and 4.

Figure 15 is a sectional elevation of a built-up stem guide adapted for use on valves having flat gate-recess caps such, for instance, as shown in Figures 1 and 2.

Figures 15A and 15B are horizontal sections taken, respectively, on the lines 45A—45A and 45B—45B of Figure 15.

Figure 1:
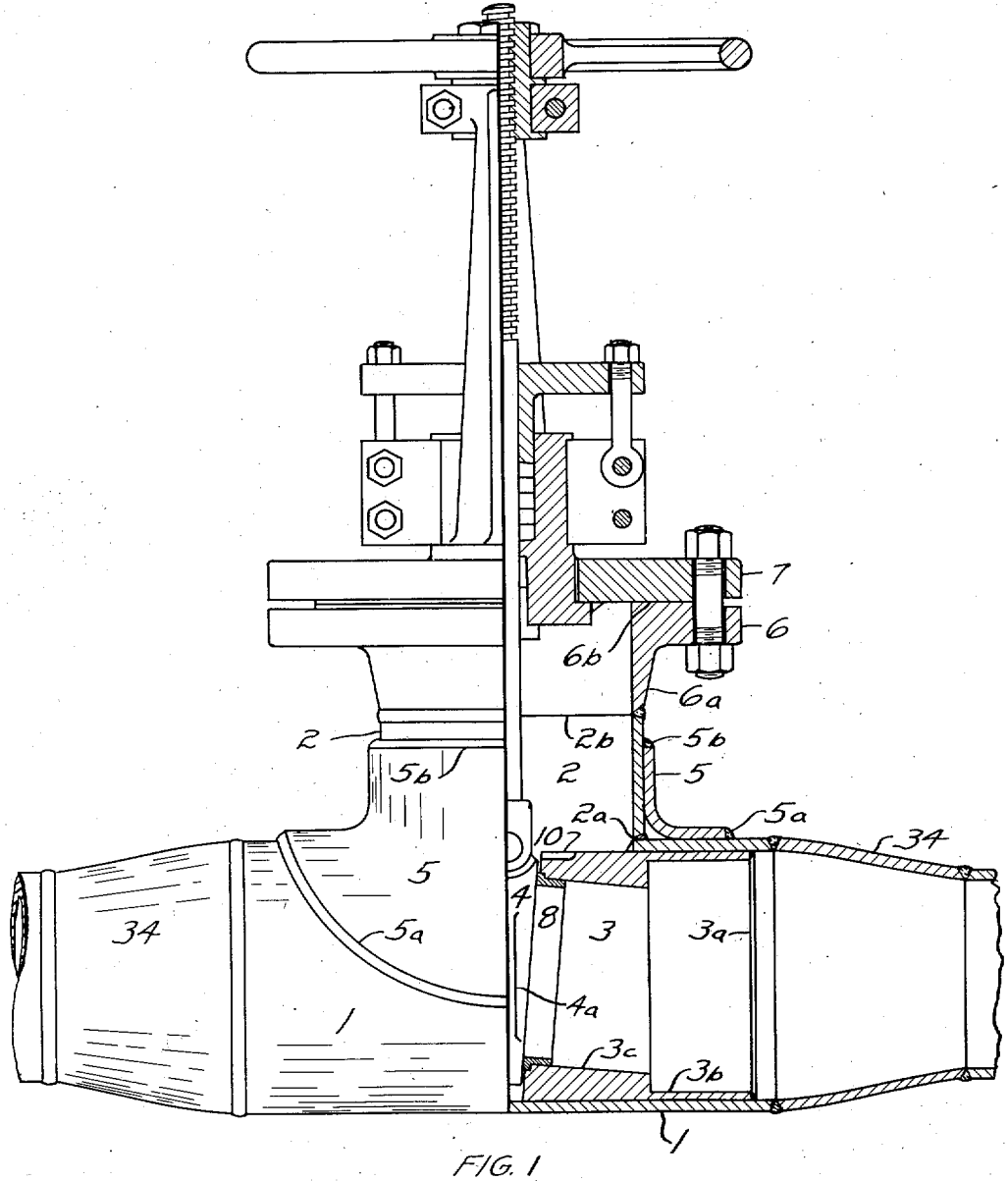
Figures 1 and 2 are, respectively, a side elevation and an end elevation, each partly in section, showing, by way of illustration, one valve construction produced in accordance with the invention.

Starting with two wrought steel pipe cylinders 1 and 2, of which cylinder 1 must be large enough to encompass two opposed port-forming cylinders 3, 3, my first step is to impose one of said cylinders 2 endwise upon the other cylinder 1 so that the axes of the two cylinders are at (or approximately at) a right angle to each other. This entails cutting the end 2a of the imposed cylinder in the contour of a saddle so that it bears at all points along its edge upon the outer curved wall of the cylinder 1 upon which it is imposed. I subsequently cut out from the wall of the cylinder 1 imposed upon, a hole within the confines of its line of contact with end 2a, but large enough to later admit the tapered gate 4 subsequently used. Having prepared the cylinders 1 and 2 in relation to each other, I now weld them together along the already scribed line connecting with end 2a, employing for this purpose either an electric arc or a gas flame, and taking advantage of any other improvements in the art of welding, for the purpose of depositing a suitable bonding metal in a state to fuse with the abutting surfaces of the two cylinders, thereby bringing them permanently into the relation of a valve-body cylinder and a gate-recess forming cylinder. This operation may, if desired, be supplemented by reinforcing the welded joint with a so-called welding saddle 5, this being a steel plate forging formed to fit over cylinder 1 as a saddle and having a raised neck encircling the other cylinder 2. These welding saddles are commercially available in sizes adapted to pipe cylinders of different diameters placed at right angles to each other. When fitted in place, the saddle 5 is welded along its two edges 5a, 5b to the respective cylinders. Following this operation or, if a welding saddle is not applied, upon completion of the unreinforced weld between the cylinders 1 and 2, I apply, also by welding as above, a steel flange 6, preferably one having a welding neck 6a which can be fitted to the end 2b of cylinder 2. This flange 6 is one having a machined face 6b adapted to form a fluid tight joint with a corresponding face on a companion flange 7, and bolt holes appropriately spaced for use in bolting said flanges together.

The next or a contemporary step in the construction of a valve of the type to which my method applies, is to provide the two port-forming cylinders 3, finished to a cylindrical circumference that will fit snugly against the inner bore of cylinder 1. To effect a neat sliding fit, I may elect to machine, drill or grind out the inner bore of cylinder 1 after the cylinders 1 and 2 have been welded together, as above described. One end 3a of each of the cylinders 3 may be in a plane perpendicular to the axis of the cylinder and be bored out concentric with said axis to a distance partially penetrating the forging, producing in effect a relatively thin cylindrical wall 3b, for reasons hereinafter explained. The other end of each cylinder 3 is surfaced in a plane inclined to its axis and corresponding to the taper of gate 4. The inclined ends of cylinders 3 are now bored out to a diameter approximating the desired port size of the valve under construction; each bore 3c being executed about an axis that is perpendicular to the inclined end of the cylinders and penetrating to the bore of the thin wall portion 3b which is of greater diameter. This last operation may be amplified if desired by making the bore that is perpendicular to the inclined face, somewhat larger in diameter than the desired port size (though still less than the opposite bore of the thin-walled portion), and threading the inside of this bore to receive facing rings 8 of special alloyed steel, externally threaded, and having an internal diameter equal to the desired port size of the valve under construction.

The next step in the process of making this valve is to insert the two port cylinders 3 into the cylinder 1 with their inclined ends opposed to each other and at a uniform angle of slope with the tapered gate 4 which acts as a wedge bearing evenly upon the faces of the said inclined ends which constitute the valve ports. To facilitate this operation with exactitude, I use a template block 9 (Figures 11, 11A, 11B, 11C and 12) corresponding in thickness and taper to the gate 4. This template block I insert between the two opposed port cylinders 3. When machining these cylinders 3 as above described, I may add a groove 10 in the outer circumference of each, located at the point of tangency upon said cylinder's circumferential surface, of the line of intersection between two planes, in one of which lies the face of the port and the other of which intersects said circumferential surface and is perpendicular thereto. The template block 9 above referred to has shoulders 9a to overlap the edges of the opposed cylinders 3, each shoulder 9a having a projecting tongue 9c to exactly fit into one of the grooves 10, thus insuring perfect alignment of the two port-forming cylinders 3. I now draw the opposing cylinders against the tapered face of the template and secure them in their positions with a bolt 11 through cross pieces 12 laid against the back of each forged port cylinder and drawn tight. The template block 9 referred to, has in addition to the features above described a center mark 9x in line with said tongues 9c and midway between the opposed port faces. This center mark 9x I now proceed to locate by shifting and turning the assembled template 9 and cylinders 3 within the barrel of the cylinder 1, until the said center mark is exactly in the center line of the future valve stem. This location can be quickly and accurately determined by means of a spider frame 13 designed, for that purpose, to fit over the face 6b of the flange 6 upon which the companion flange 7 is later to be bolted, this spider having a bar 13a slidably mounted in the spider and occupying the exact position of the future valve stem in relation to said flange. This sliding bar 13a is now dropped upon the template and held in that position until the center mark 9x registers with the pointed extremity of said bar. This having been accomplished, I now spot weld both cylinders 3, at points along their thin-walled ends 3a, to the interior wall of the body cylinder 1. By spot welding, I refer to the practice of welding the contacting edges at a small spot or spots, accomplished preferably in this instance by heating a small bit of welding metal to a temperature at which it will fuse with the two contacting surfaces upon which deposited, thus holding them in position until they can be more solidly welded together about the entire line of contact between their thin walled ends 3a and the said body cylinder.

In performing the operations above described, I observe precaution to avoid distortion in relative position of the opposing port faces and any possible deterioration in the quality of metal of the port rings 8 with which the ports are faced, either of which conditions might be occasioned by heat transmitted to the ports while welding is in process. The spot welding operation above referred to may be accomplished without appreciable heat expansion of the entire port cylinder 3 or of the cylinder 1 to which it is welded, particularly if the electric arc welding process be employed. Hence, the opposed port cylinders 3 are fixed in their proper positions relatively to each other and to the body cylinder 1, as established by the template. The bolt 11 and cross-pieces 12 can now be taken off, the template 9 removed, and the operation of welding the port cylinders 3 around their entire edges 3a completed, thus assuring their ultimately correct positions as determined by the template. Inasmuch as the heat accompanying this welding operation may have a destructive effect upon the temper of the special alloy steel rings 8 with which the ports are faced, I may find it expedient to conduct this operation upon each cylinder with its port end immersed in water or some other heat absorbing liquid. Another means by which I can localize the welding heat incident to this operation is to employ either the welding process designated as "Lindeweld", or else the electric arc process of welding, either of which processes operates generally on the principle of melting the welding rod and depositing, upon the contacting surfaces to be bonded, molten metal having a temperature sufficient to fuse therewith, thus avoiding the necessity for preheating the parts to be welded to a high temperature. Still another precaution to which I may resort to prevent heating the body, the port cylinder, or the port faces to damaging temperature, is to lengthen the thin cylindrical walls 3 so that the welded end 3a is more remote from the port face. With this construction it is possible to bring that portion in the immediate locality of the weld to a welding heat quickly, without heating the entire body of the cylinder to corresponding temperature.

A succeeding step in the process of constructing a valve by my method, is to apply guides 14 that direct the gate 4 to a uniform bearing upon the opposed valve port faces and hold the gate in a straight line of travel when being withdrawn therefrom. These guides 14 may be rectangular ribs of steel projecting from the inner wall of the cylinder 2 and designed to engage grooves 4a in each side of the gate 4. Having machined two rectangular ribs 14 of steel to length, breadth and width proper for this purpose, another template 15 (Figures 12, 13, 13A and 13B) can be used to locate them upon cylinder 2 symmetrically in relation to the valve ports and in line with intended gate travel. As in the operation of locating the opposed valve ports, location of these guide ribs 14 may be correctly determined in several ways; but if the tapered template block 9 with groove engaging tongues 9c as above described, is employed to locate the opposed valve ports within the valve body, then I prefer to equip the template 15 with a notch 15a which will interlock with a corresponding notch 9y of the port-locating template 9, and thereby fixedly position the two templates concentrically and at right angles to each other. That is to say, if template 9 is still in a position determining the proper port location, guide locating template 15 is laid upon said template 9 with notches 9y and 15a interlocked. This will establish the second or superimposed template 15 at right angles to the template 9, with the center mark 15z on the upper template directly over the center mark 9x on the lower template. If it be desired to effect the proper location of said guide ribs 14 coincidently with the operation of locating the opposing valve port cylinders 3 within the valve body, then the two templates 9 and 15 can be placed one upon the other, as described, and the sliding bar 13a occupying the future position of the valve stem, determined by the spider frame 13 fitted over the bonnet flange 6, can be brought down upon the second template and held in that position until the center mark 15z thereon registers with the pointed extremity of said bar.

Since this center mark 15z coincides in alignment of the bar 13a with the center mark 9x upon the template 9 below, the opposing valve ports are thus correctly located, as when the template 9 is used alone. But with the template 15 thus applied, the guide ribs 14 can now be located in their correct positions upon the inner walls of the cylinder 2 and spot welded thereto. This positioning of guide ribs 14 is accomplished by placing them in jaws 15b at either end of the second template 15. These jaws clasp the guide ribs symmetrically with respect to the center axis of the template and said guide ribs are held firmly against the interior wall of cylinder 2 in this alignment by set screws 15c projecting through lugs 15d at both ends of the template; these screws 15c bearing outwardly from the center of the template upon the face of each guide rib 14. Having thus located the guide ribs 14 as desired and spot welded them in their correct positions, the template 15 can be removed and the guide ribs welded solidly along each contacting edge thereof with the inner wall of the cylinder 2.

My method of constructing valves of the gate type as described in the foregoing may be elaborated upon in various ways to the effect of simplifying one phase of construction at the expense of another phase, yet adhering to forms, to the production of which commercially available wrought steel shapes will be appropriate. For instance, as shown in Figures 3 and 4, I minimize the size and simplify the construction of the interior port-forming cylinders by giving to these cylinders the form shown at 16 in said figures, to accomplish which I commence with cylindrical bodies of uniform wall thickness, then face one end 16a of each cylinder in a plane inclined at an angle corresponding to the taper of the gate 4, and the other end 16b of each cylinder in a plane perpendicular to its axis; then trim the portion of the cylinder adjacent its perpendicular face to a thin wall section 16c about the inner circumference thereof by removing metal from the outer circumference for a short distance back from its said perpendicular face, thereby producing pieces as shown in detail in Figures 3A, 3B and 3C. In determining the diametrical dimensions of these cylinders, the outer diameter is made the same as the outer diameter of the connecting pipe ducts 17 in the line of which the valve is to be inserted, and the inner diameter is made slightly less than the inner diameter of said ducts. In trimming the outer circumference, as above described, the object is to enable the remaining thin cylindrical wall section to telescope with said connecting pipe duct 17 in such manner that the said thin wall section of each port-forming cylinder will slide inside of the connecting pipe duct and allow the end face of this pipe duct to bear flatly against the shoulder 16d left upon the outer wall of the cylinder at the point where the thin wall section terminates.

Figure 17:
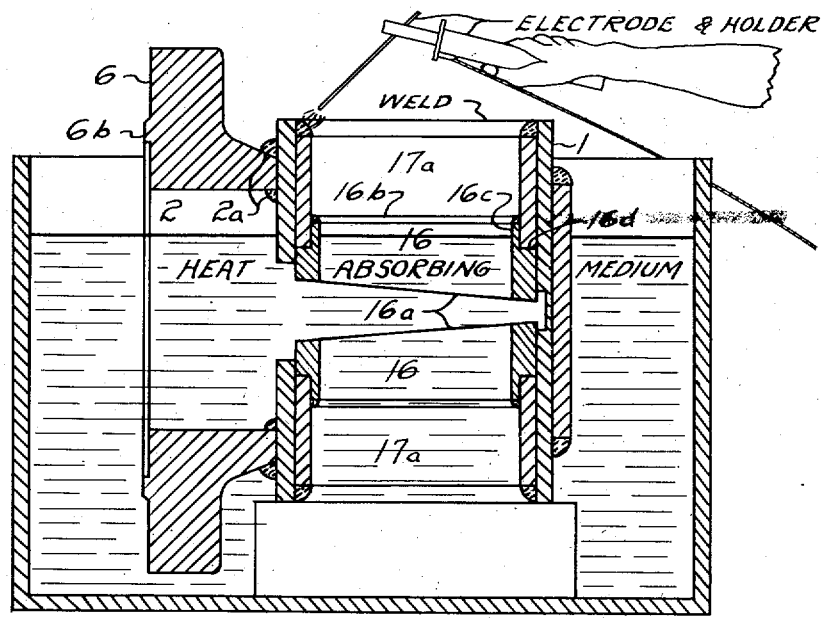
Figures 16 and 17 are views, partly sectional, illustrating the method of protecting port faces of a valve structure from injurious heat effects while another portion of the valve structure is being welded.
Figure 16:
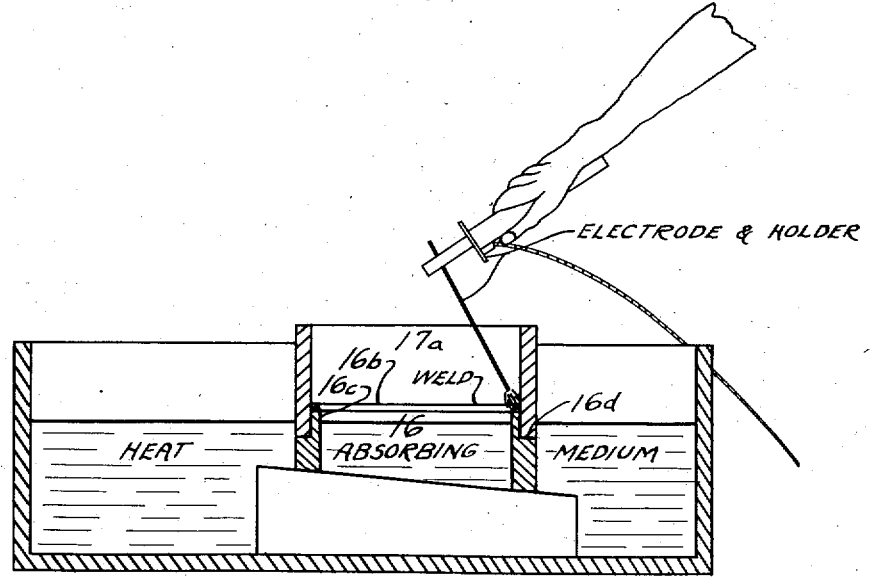

Taking the two port-forming cylinders 16 required in the valve constructed in accordance with Figures 3 and 4, I apply short connecting duct sections 17a as parts of the duct 17 at one end of each cylinder, so that the entire end face of such short section 17a bears firmly and solidly against the abutting shoulder 16d of the port-forming cylinder 16. With the ports in this position, I weld the extremity of the thin cylindrical wall section 16c to the inner wall surface of the duct section 17a into which it has been telescoped, completing the welded bond between said cylinder and pipe around the entire circumference thereof. In making these welds, I take care to avoid heating the opposite or port-forming end of this cylinder to an extent that might alter the chemical or physical characteristics thereof. Such precautions may take the form illustrated in either Figure 16 or Figure 17 of immersing the said port-forming end of the cylinder in water or some other heat absorbing liquid while making the weld or employing a welding process wherein the heat is principally localized in immediate vicinity of the weld. This is one reason for forming a thin cylindrical wall section at the point where the weld is to be made, as the amount of heat absorbed by the body of the cylinder incident to the welding operation is not only thus reduced but the quantity of molten metal required to complete the bond between said port cylinder 16 and duct section 17a is much less than if the full end thickness of both parts were welded in abutting relationship.

While I prefer to employ a thin wall section upon which to apply the above-described welding operation, the effect I am striving to accomplish might be realized by constructing the ports as shown in Figure 5, according to which the inner bore of the port forming cylinder 18 equals the inner diameter of the connecting duct 19, and a narrow bevel 18a is cut upon the inner circumferential edge of the perpendicular face of said cylinder 18 instead of trimming it to a thin cylindrical wall projecting therefrom as described in connection with Figures 3 and 4. If this procedure is followed, the abutting ends of said cylinder and pipe are made to bear uniformly over their entire surface with the exception of the narrow beveled portion of the rim, and when welded the molten bonding metal is applied only in this narrow groove section formed by the bevel.
In either the procedure of Figures 3 and 4 or that illustrated in Figure 5, the port-forming cylinder and connecting section of the duct are so placed as to receive any thrust from one to the other upon their abutting end faces which present flat contacting surfaces of ample area to sustain the thrust pressure; the weld being applied primarily for the purpose of sealing the joint between these two parts in a manner to prevent liquid flow therethrough, rather than to assume a compression or tension stress between the welded bodies when the valve is placed in use.

If the construction of the port-forming cylinders is modified within the process herein outlined, so that the cylindrical surfaces which form the exterior and interior thereof are parallel, as shown in Figures 3 and 5, and it should prove desirable to provide some clearance space beyond the port faces in the direction of travel of the gate, I may provide an indentation 20a in the flat steel plate 20 (Figures 4A and 4B), from which the body cylinder 21 (Figure 3) is formed, this indentation being of sufficient length, width and depth to provide the necessary clearance recess after the plate has been rolled into cylindrical form and welded along its abutting edges 20b. Prior to forming the valve body cylinder 21 from the flat plate 20 as described, I may remove therefrom all or a portion of the metal along the lines 20c which would otherwise have to be cut out later from the cylinder which it is to form, in providing the necessary opening into cylinder 22. Construction of the valve by the method now under consideration is continued by forming the valve body cylinder 21 from the indented plate 20 by rolling the latter into cylindrical form, with an inner diameter equal to or slightly less than the outer diameter of the port-forming cylinders 16. After welding this rolled plate along its abutting edges 20b to form a solid cylindrical ring with an internal diameter as above stipulated, I then impose thereon a gate recess-forming cylinder 22, and weld the two cylinders together along their lines of contact 22a. As in the corresponding procedure previously described, I now cut out a portion of the cylinder 21 lying inside the line of contact 22a, with the gate recess cylinder imposed thereon, unless this has been done when piece 20 was flat. If the inner diameter of cylinder 21 is originally made slightly less than the outside diameter of the port-forming cylinders 16, I now bore cylinder 21 to afford a neat sliding fit for the insertion of said cylinders 16 and the connecting pipe sections 17a to which they have been welded, as hereinbefore described. The operation of inserting the two cylinders 16 with their port faces 16a in proper opposed relationship may be similar to that already described in connection with Figures 11, 11A, 11B and 11C, except that I may prefer to omit the tapered faces on the template and equip it with a rounded shoulder 23 and dowel pins 23a as shown in Figures 11D and 11E, and form the cylinders 16 with dowel-holes 16e (Figures 3A, 3B and 3C) to receive said dowels in place of employing the tongue and groove previously described as the means for registering the opposed positions of these ports in their correct relation. The location of the two ports in correct relation to the valve body and valve stem to be subsequently applied, can then be determined by centering the template in the manner described in connection with Figure 11. When the opposing port faces are thus correctly located with reference to each other and to the valve body, the pipe sections 17a welded thereto protrude from the body cylinder 21 and can be welded around the edges 21a of body cylinder 21, thus firmly fixing the valve ports in their proper position as an integral part of the valve structure.

Another modification to which my method of making valves is susceptible without deviating from the principles of fabrication identifying the present invention, is obtained by forming the valve body, as shown in Figures 5 and 6, from two relatively short cylinders 24 of equal diameter and wall thickness, each disposed about the same axis and placed a short distance apart to form the clearance space beyond the port faces 18b in the direction of gate travel. Now, instead of cutting one edge of the gate recess cylinder 25 entirely in the form of a saddle to contact with and be welded to one side only of the body cylinder, as proposed in the method and modifications thereof already described, the edge 25a of said cylinder is cut partially in the form of a saddle having a crotch 25b conforming to the outer cylindrical surface of the valve body cylinder 24. On either side of this crotch 25b, the edge of the cylindrical wall is extended to include a narrow strip 26 parallel to the axis of the cylinder. The width of this strip is made only sufficient to overlap the clearance space above referred to between the two cylindrical body sections 24 and long enough, when the crotched cylinder 25 is imposed upon the said cylindrical body sections, to be wrapped around said sections so that the two strips 26 will meet and can be welded together at 27. If the crotched cylinder 25 is now welded to the two cylindrical body sections 24 along the entire lines of contact 25a and 25b, between the edges thereof and the cylindrical surfaces of said body sections, the effect is to produce a continuous solid valve body cylinder into which may be inserted two port-forming cylinders 18 with inclined end faces 18b constituting the valve ports in opposed relationship and with clearance space beyond the said faces in the direction of gate travel. The manner in which said valve port cylinders 18 are inserted in this built up body cylinder 24, 25 and accurately located in their proper opposed relationship to receive the tapered valve gate to be introduced through cylinder 25 in the completed valve, can be the same as previously described in connection with Figure 11, or modified in accordance with Figures 11D and 11E. After thus properly locating these port cylinders with their abutting pipe connections 19 bonded thereto by the narrow weld in bevel 18a, the extensions 19 are in turn welded around their outer circumferences to the valve body cylinder, at the point 24a where they project therefrom.

Figure 8:
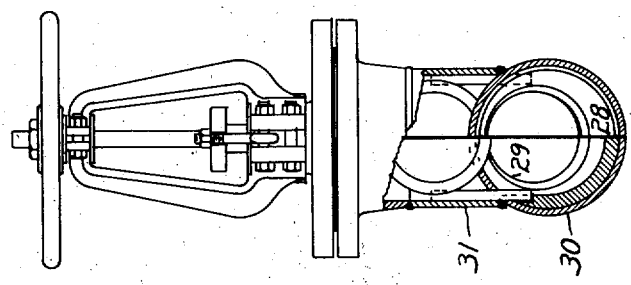
Figures 7 and 8 are, respectively, a side and an end elevation, partly in section, showing another construction of valve produced in accordance with the invention.
Figure 7:
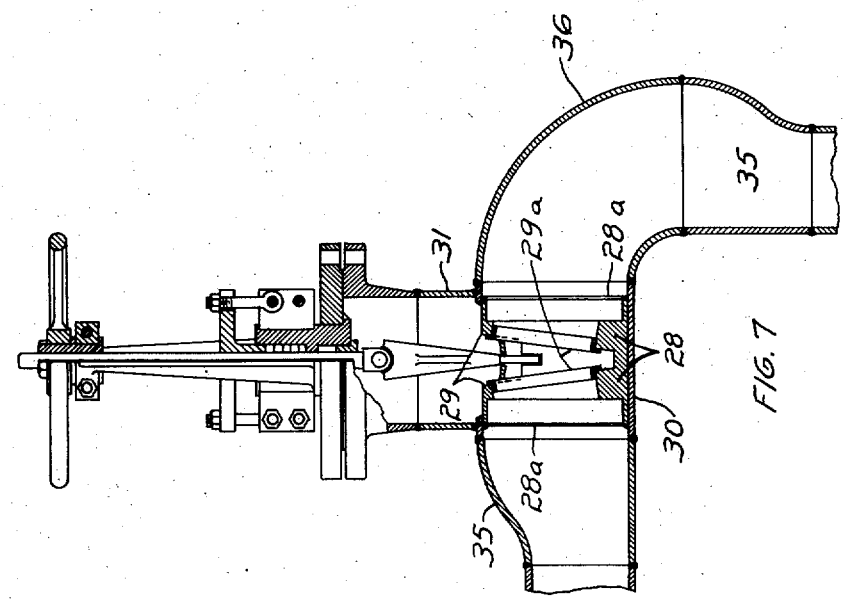

Still another modification within the purview of the present invention, and one having the effect of simplifying the operations involved in assembly although involving a more intricate forging and machining in forming the opposed ports within the valve body, will now be described in connection with Figures 7 and 8, which show both ports made from an integral steel block 28 from which can be machined the inclined faces of the two opposed valve ports 29, by means of a milling tool, which operation is followed by boring out the two cylindrical ports to the desired diameter and then applying port facing rings 29a of alloyed steel, if desired, threaded into the cylindrical port bores. The steel block 28 embodying both valve ports is machined to an outer circumferential surface that will fit into the valve body cylinder 30. This procedure obviates the necessity for locating two separate opposed ports 29 in relation to each other, preliminarily to welding them in place; but it is still essential to ascertain that these ports are properly positioned in relation to the valve body cylinder 30 and gate recess cylinder 31, which can readily be accomplished by means substantially as have already been described. When thus located, I proceed to weld the circular ends 28a of this cylinder to the inner wall of the encasing valve body cylinder 30.

Still another alternative method within the purview of the present invention is illustrated in Figures 9 and 10, according to which the opposed ports are machined from a single steel block 32, and a gate recess cylinder 33 is welded directly upon the outer cylindrical wall of said block 32 so as to encompass the opening through which the gate 34 is withdrawn from or inserted between the opposed ports. In this modification, each end of the block 32 is bored out to leave a thin cylindrical wall 32a protruding to edges 32b where welds can be made with the pipe duct in line of which the valve is to be inserted.

To join a gate valve, constructed in accordance with any of the herein described modifications of the invention, with the duct in the line of which the valve is used, I can employ various forms of manufactured pipe connections available with ends adapted for welding, such as concentric swaged nipples 34 (Figs. 1 and 9); or eccentric swaged nipples 35 (Fig. 7); or 90° elbows 36 (Fig. 7) or elbows of other angularity; or flanges 37 (Fig. 5). Through the use of these swaged nipples, elbows or the like, any valve constructed in accordance with the present invention, notwithstanding enlargement of the valve bodies incident to the novel fabrication described, may be readily equipped with inlet and outlet connections appropriate for direct butt welding to duct members corresponding in dimension to the rated size of the valve, determined by the area of its internal ports of closure; and these fittings so adapt themselves to the valve body of the present invention that when the valve is close to an abrupt angle in the connecting duct, as suggested for example in Figure 7, the welding of a wrought steel pipe elbow, with beveled ends of the same diameter as the valve body cylinder, directly thereto, at the angularity desired and then welding a swaged nipple to the other end of said elbow and reducing the duct leading from the valve to an integral diameter equal to the valve ports, will permit the valve to lie very close to the confines of the available angular space and thus make it possible to locate a valve of the present invention in situations where an ordinary flange-coupled valve would not be admitted.

Where my method of constructing valves as above described is so modified that the internal port-forming cylinders protrude from either end of the valve body cylinder or are welded to short pipe cylinders which extend out from said body cylinder, these projecting cylindrical pipe sections are first beveled and can then be welded direct to abutting edges of the connecting duct which is of the same internal diameter, as suggested in Figure 3. If, instead of constructing a valve purposely adapted to being welded into and becoming an integral part of the duct in the line of which the valve is installed, it is desired to construct a valve by my method having a flanged joint with said duct, then I can modify the procedure outlined to the extent of welding onto the cylindrical edges projecting from said valve body cylinder, a flange joint of the type being manufactured with a welding neck, as suggested in Figure 5.

The valve bonnet (Figures 14 and 15), which is a bolted-on cap over the recess into which the gate is withdrawn from between the ports of closure, is likewise susceptible to fabrication consistent with the procedure herein described for constructing the valve body with its ports of closure, etc. That is, I may continue the process of employing forged and wrought steel parts in commercially available forms in the construction of this part of the valve, by following, preferably, the method now to be described. Commencing with a wrought steel companion flange 37 (Figure 14) of suitable diameter, number and size of bolts, area of contacting faces, etc., and of the type manufactured with beveled neck 37a adapted for welding, I weld onto its neck a domed forged steel pipe-cap 38, commercially designated as a "bull plug" and manufactured with beveled edges adapted for such welding. After thus assembling this pipe cap and flange, I bore a hole 39 through the center of said cap, large enough to insert a packing box 40 to surround a valve stem 41, which packing box can be machined from a round forged steel bar in a manner to leave a shoulder 40c exceeding the size of said hole 39, which shoulder fits against and is welded to the inner contour of said cap while the barrel projects through said cap. Now taking the assembled cap, flanges and packing box, I machine the latter to accurate cylindrical dimensions concentric with and perpendicular to the face of flange 37, and in so doing I provide a packing chamber 40a having an end wall 40b and bore the latter to receive the stem 41. Member 40 can be additionally machined to receive a guide bushing 42 for causing stem 41 to travel in correct alignment. I may modify the construction of the bonnet and make it in accordance with Figure 15, in which I employ a solid flat "blind" flange 43 in place of the welding neck flange 37 with its domed cap shown in Figure 14. And in this case, I apply a packing box 44 similarly machined from a round steel bar and leaving thereon an enlarged flat-shouldered end 44a. I then drill a hole 43a in flange 43 through which I project the machined packing box 44 up to said shoulder 44a, which latter lodges against the inside of said flange and is welded thereto.

Figure 2:
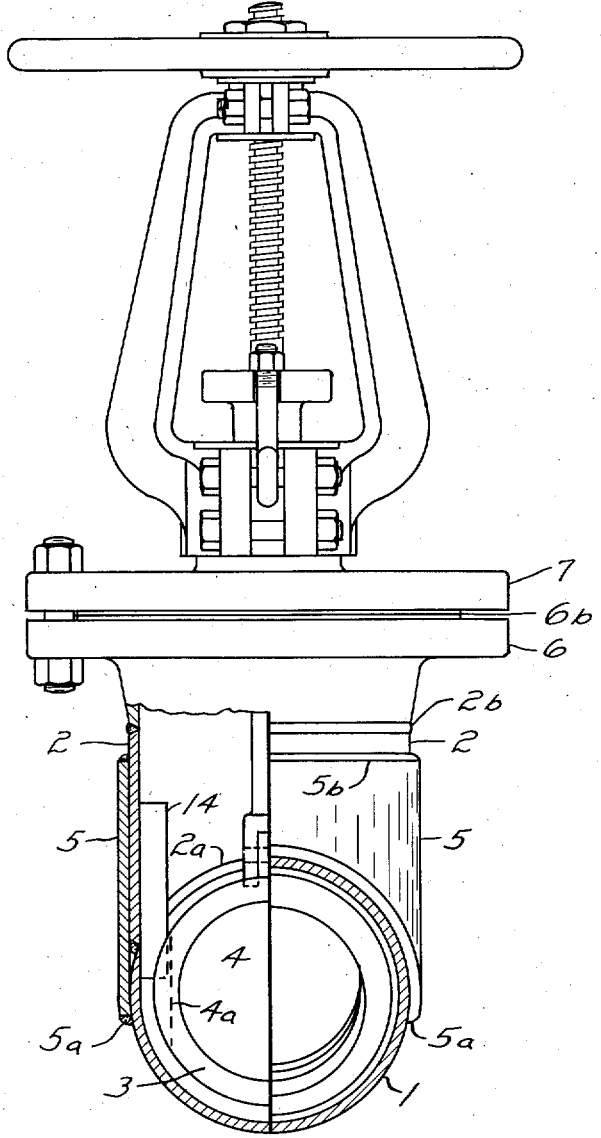

Continuing the construction of a gate valve entirely from wrought steel parts in their commercially available sections, I may provide a yoke for guiding the valve stem travel, as illustrated in Figures 15, 15A and 15B, by cutting two or more members 45 from an ordinary steel bar, such as a T section, appropriate to forming the frame of said yoke, then welding these members at ends 45a to the bonnet flange 43, and at their ends 45b to a forged and machined collar 46 through which the valve stem 41 is threaded. Collar 46 and hand wheel 47 for manipulating the stem 41, where such means are employed, may follow the detail disclosed or be of ordinary construction. Likewise, the valve stem 41, which is most readily made from a round forged steel bar, and the tapered gate 4 (Figures 1 and 2) controlled thereby, may as usual be machined from a simple disk forging.

From the foregoing it will be seen that the present invention affords advantages in not only the structural features of the valve, but in the process of its fabrication, as compared with the more laborious and lengthy, hence more expensive, valve manufacturing methods it supersedes; also that the invention results in the creation of a superior product from the standpoint of structural design, as gauged by standards of strength in relation to weight, close clearances obtainable in respect to valve locations, adaptability to "all welded" pipe installations, etc. By virtue of the proposed methods of construction, I am able to achieve objectives in valve construction heretofore regarded as impracticable of attainment on a commercial scale, such, for instance, as fabrication of very large gate valves suited to the highest steam pressures now employed in power plant practice, or the highest gas and liquid pressures contemplated in long distance pipe transmission lines; or, the fabrication of wrought steel valve bodies and interior parts entirely of special alloyed steels such as are embraced in the "stainless steel group", for any fluid pressure demanded or size required, whereas, heretofore, it has only been considered possible to approximate this objective in the form of valves with cast steel bodies lined with alloyed steel surfaces applied to the finished casting.

These results, I contend, are not achieved by a mere extension of well known welding practices that would naturally become obvious in the progressive development of this art, for proof of which I would cite the now general substitution of welded pipe elbows, etc., in place of cast fittings, while the very great advantage of such practices applied to gate valve construction as here proposed has remained undeveloped. But to accomplish so revolutionary a development in valve construction required more than the abstract idea to make it a practical reality; it required the exercise of invention sufficient to insure its practical realization, such as exhibited in the foregoing specification and accompanying drawings, with particular reference, for instance, to the measures of vital importance that I have devised for avoiding the damaging effect of heat upon the valve seats incident to welding operations, failure to conceive of which has caused the practice of welding to be regarded as unsuitable in valve construction as herein proposed. Again, practical measures such as I have outlined for properly aligning the opposed valve ports within the valve body and positioning the guides, etc., measure the difference between an easy, economical manufacturing operation and a difficult, lengthy and costly process. These and other features in the method proposed for constructing valves, coupled with the broad conception of an extension of welding to the construction of valves wholly from wrought steel, amounts to an invention for which I claim.

I claim:

1. In the fabrication of wrought metal into valves of the gate type, that improvement which includes forming in a rectangular wrought metal plate, an elongated dished depression and cutting into the ends of said plate, congruent recesses symmetrical to the major axis of said elongated depression; then bending said plate into a circle about an axis on the depressed side of said plate and at right angles to said major axis until its ends meet to form a first cylinder with the said depression in its bore and said recesses forming a surface aperture thereon; welding together the said meeting ends; conforming one end of a second wrought metal cylinder to the outer surface of the thus formed first cylinder; adjusting the position of said second cylinder thereon until its axis is symmetrical to said depression and until its edge contacting upon the surface of the first cylinder encompasses the said aperture; then welding said second cylinder along its contacting end upon the surface of said first cylinder; providing a valve port upon one end of each of a third and a fourth wrought metal cylinder of like circumferential dimensions; welding the other end of each of said third and fourth cylinders around its edge to an abutting pipe section; inserting said third and fourth cylinders together with their abutting pipe sections into said first cylinder and adjusting their positions therein until their port ends are located over said depression and in position to receive a valve gate to be introduced through said second cylinder; securing the said third and fourth cylinders with their abutting pipe sections by welding at the ends of said first cylinder; and capping the open end of said second cylinder with a valve bonnet.

2. In the fabrication of wrought metal into valves of the gate type, that improvement which includes providing a valve port upon one end of each of a first and a second wrought metal cylinder of like circumferential dimensions; welding the other end of each of said cylinders along its edge to an abutting pipe section; cutting one end of a third wrought metal cylinder into the form of a saddle with an extension on each side of its crotch; rolling said extensions in a circular direction until their ends meet to form a barrel; welding together said ends; placing the port ends of said first and second cylinders in said barrel; positioning the opposed port ends to receive a valve gate to be introduced through said third cylinder; and securing, by welding, both said first and second cylinders with their abutting pipe sections relatively to the edges of the circular opening of said barrel.

3. In the fabrication of wrought metal into valves of the gate type by welding, the improvement which includes providing a wrought metal pipe T; forming two like valve ports of wrought metal with registering means at corresponding positions on their peripheries; inserting said valve ports into the through barrel of said T in an opposed relation until the faces of said ports bear upon opposite faces of a template block spaced according to the desired dimension between said ports in the completed valve; sliding said template upon said ports until said registering means on the peripheries of said ports register, respectively, with coacting aligned registering means on the ends of said template block; sliding the template block and both ports in unison until the center mark in the surface of said block registers with the axis of the branch barrel of said T; applying a positioning weld between the outer edge of each of said annular ports and the inner surface of said through barrel; later removing said template block from contact with said ports; and completing the weld between each port and said through barrel around the inner circumference of the latter.

4. In the fabrication of wrought metal into valves of the gate type by welding, the improvement described in claim 3, supplemented by the intermediate procedure of welding a flange to the open end of the branch barrel of the T and centering upon this flange, a frame having an axially guided sliding bar which, when said frame is centered upon said flange, assumes the position to be occupied by a valve stem in the completed valve; then obtaining an alignment between said center mark in the template block with the pointed end of said sliding bar, before the ports are welded to the through barrel.

5. In the fabrication of wrought metal into valves of the gate type by welding, the improvement described in claim 3, supplemented by the intermediate operations of mortising a second template across the mid-point of the first described template and at right angles thereto, causing said second template, at its respective ends to hold gate guiding members against the inner wall of the branch barrel of the T, in gate guiding positions of the completed valve; then welding each of said guiding members at a point along its contacting edge to the branch barrel; and later removing said second template and completing the weld along the contacting edges between said guiding members and the inner wall of said branch barrel.

6. In the fabrication of wrought metal into valves of the gate type, the improvement which includes forming a valve-body cylinder having a through bore circumferentially dimensioned to fit the periphery of port-carrying rings, and forming a gate-recess cylinder internally dimensioned to house a valve gate; conforming one end of said recess cylinder to fit saddle-like upon the outer curved surface of said body cylinder with its axis approximately perpendicular to the body axis; imposing the conformed end of said recess cylinder upon the surface of said body cylinder and welding said cylinders together in a continuous line following said conformed end; cutting an aperture through the walls of said body cylinder, suited to the passage of a valve gate from said recess cylinder into said body cylinder; forming a valve port upon one end of each of two ring members peripherally dimensioned to fit the bore of said body cylinder, and sliding said ring members axially into said bore; introducing a valve gate from said recess cylinder through said gateway and adjusting the locations of said ring members in said body cylinder until their port ends are positioned so that the surfaces of the ports thereon register with opposite faces of said gate; fixing the thus located relative positions of said recess cylinder and said ring members in said body cylinder by welding, and sealing each of said ring members around their periphery to the bore of said body cylinder by welding.

7. The method of fabricating wrought metal into valves as described in claim 6, in which templates axially determinate to said recess cylinder, angularly symmetrical to said ports and dimensionally equivalent to said valve gate are employed in the process of adjusting said recess cylinder and said ring members in said body cylinder to the prescribed relative locations preliminary to fixing these positions by welding.

8. In the fabrication of wrought metal into valves of the gate type, that improvement which includes cutting into parallel ends of a wrought metal plate, congruent recesses, then bending said plate until its recessed ends meet to form a through-bored valve-body cylinder with said recesses forming a surface aperture thereon; welding together the said meeting ends; conforming one end of a gate-recess cylinder to the outer curved surface of said body cylinder; adjusting the position of said recess cylinder thereon until its conformed edge encompasses said aperture; then welding said recess cylinder to said body cylinder in a continuous line encircling said aperture; forming a valve port upon one end of each of two ring members peripherally dimensioned to fit the through bore of said body cylinder, and sliding said ring members axially into said bore; introducing a valve gate from said recess cylinder through said aperture and adjusting the locations of said ring members in said bore until their port ends are positioned so that the surfaces of the ports thereon are adapted to register with opposite faces of said gate; fixing the thus located relative positions of said recess cylinder and said ring members in said body cylinder by welding and sealing said rings around their periphery to the bore of said body cylinder by welding.

9. In the fabrication of wrought metal into valves of the gate type, the improvement which includes forming a valve-body cylinder having a through bore circumferentially dimensioned to fit the periphery of a port-carrying cylinder, and forming a gate-recess cylinder internally dimensioned to house a valve gate; conforming one end of said recess cylinder to fit saddle-like upon the outer curved surface of said body approximately perpendicular thereto; imposing the conformed end of said recess cylinder upon the surface of said body cylinder and welding said cylinders together in a continuous line following said conformed end; cutting an aperture through the walls of said body cylinder, suited to the passage of a valve gate from said recess cylinder into said body cylinder; forcing a port-carrying cylinder, hollowed along its cylindrical axis, slotted transverse to said axis and peripherally dimensioned to fit the bore of said body cylinder; forming two oppositely disposed valve port faces upon opposite sides of said slot as to surround the intersections of said slot with said hollow; sliding said port-carrying cylinder axially into said bore; introducing a valve gate from said recess cylinder through said aperture and adjusting the location of said port-carrying cylinder in said body cylinder so that the surfaces of the ports thereon register with opposite faces of said gate; fixing the thus located relative positions of said recess cylinder and said port-carrying cylinder in said body cylinder by welding, and sealing said port-carrying cylinder around its entire periphery on both sides of said slot, to said body cylinder by welding.

10. In the fabrication of wrought metal into valves of the gate type, that improvement which includes cutting one end of a gate-recess cylinder into the form of a saddle; bending the depending wall portions of said saddle until the ends thereof converge, joining said ends by means of welding, inserting tube sections in the annular opening thus formed and welding said sections to the edges of said opening so that they protrude therefrom and are disposed about a common axis therethrough, to form in conjunction therewith, a valve-body cylinder; forming a valve port upon one end of each of two ring members peripherally dimensioned to fit into the concave surface of said valve-body cylinder, and sliding said ring members axially into said cylinder; introducing a valve gate from said recess cylinder into the space between oppositely disposed ends of said tube sections, and adjusting the locations of said ring members in said body cylinder until their port ends are positioned so that surfaces of ports thereon register with opposite faces of said gate; fixing the thus located positions of said ring members in said body cylinder by welding, and sealing each of said ring members around its periphery to the concave surface of said body cylinder by welding.

11. In the fabrication of wrought metal into valves of the gate type, that improvement which includes cutting one end of an annular gate-recess chamber into the form of a saddle, and joining the depending wall portions of said saddle by welding, to form an annular barrel having a cylindrical wall continuous in circumference except for an aperture to said recess chamber suited to the passage of a gate therefrom; forming two tube members each inwardly supporting a port ring and outwardly dimensioned to fit the concave surface of said barrel, and inserting said tube members axially into said barrel; introducing a valve gate through said aperture into said barrel, and adjusting the positions of said port rings until the faces thereof are positioned to register with opposite faces of said gate; fixing the thus located positions of the port rings and tube members in said barrel by welding, and sealing each of said members around its periphery to the annular wall of said barrel.

LELAND G. PLANT.

CERTIFICATE OF CORRECTION.

Patent No. 2,034,418.  March 17, 1936.

LELAND G. PLANT.

It is hereby certified that error appears in the printed specification of the above numbered patent requiring correction as follows: Page 9, first column, line 31, claim 9, for the word "forcing" read forging; and that the said Letters Patent should be read with this correction therein that the same may conform to the record of the case in the Patent Office.

Signed and sealed this 28th day of April, A. D. 1936.

(Seal)

Leslie Frazer
Acting Commissioner of Patents.

of two ring members peripherally dimensioned to fit the through bore of said body cylinder, and sliding said ring members axially into said bore; introducing a valve gate from said recess cylinder through said aperture and adjusting the locations of said ring members in said bore until their port ends are positioned so that the surfaces of the ports thereon are adapted to register with opposite faces of said gate; fixing the thus located relative positions of said recess cylinder and said ring members in said body cylinder by welding and sealing said rings around their periphery to the bore of said body cylinder by welding.

9. In the fabrication of wrought metal into valves of the gate type, the improvement which includes forming a valve-body cylinder having a through bore circumferentially dimensioned to fit the periphery of a port-carrying cylinder, and forming a gate-recess cylinder internally dimensioned to house a valve gate; conforming one end of said recess cylinder to fit saddle-like upon the outer curved surface of said body approximately perpendicular thereto; imposing the conformed end of said recess cylinder upon the surface of said body cylinder and welding said cylinders together in a continuous line following said conformed end; cutting an aperture through the walls of said body cylinder, suited to the passage of a valve gate from said recess cylinder into said body cylinder; forcing a port-carrying cylinder, hollowed along its cylindrical axis, slotted transverse to said axis and peripherally dimensioned to fit the bore of said body cylinder; forming two oppositely disposed valve port faces upon opposite sides of said slot as to surround the intersections of said slot with said hollow; sliding said port-carrying cylinder axially into said bore; introducing a valve gate from said recess cylinder through said aperture and adjusting the location of said port-carrying cylinder in said body cylinder so that the surfaces of the ports thereon register with opposite faces of said gate; fixing the thus located relative positions of said recess cylinder and said port-carrying cylinder in said body cylinder by welding, and sealing said port-carrying cylinder around its entire periphery on both sides of said slot, to said body cylinder by welding.

10. In the fabrication of wrought metal into valves of the gate type, that improvement which includes cutting one end of a gate-recess cylinder into the form of a saddle; bending the depending wall portions of said saddle until the ends thereof converge, joining said ends by means of welding, inserting tube sections in the annular opening thus formed and welding said sections to the edges of said opening so that they protrude therefrom and are disposed about a common axis therethrough, to form in conjunction therewith, a valve-body cylinder; forming a valve port upon one end of each of two ring members peripherally dimensioned to fit into the concave surface of said valve-body cylinder, and sliding said ring members axially into said cylinder; introducing a valve gate from said recess cylinder into the space between oppositely disposed ends of said tube sections, and adjusting the locations of said ring members in said body cylinder until their port ends are positioned so that surfaces of ports thereon register with opposite faces of said gate; fixing the thus located positions of said ring members in said body cylinder by welding, and sealing each of said ring members around its periphery to the concave surface of said body cylinder by welding.

11. In the fabrication of wrought metal into valves of the gate type, that improvement which includes cutting one end of an annular gate-recess chamber into the form of a saddle, and joining the depending wall portions of said saddle by welding, to form an annular barrel having a cylindrical wall continuous in circumference except for an aperture to said recess chamber suited to the passage of a gate therefrom; forming two tube members each inwardly supporting a port ring and outwardly dimensioned to fit the concave surface of said barrel, and inserting said tube members axially into said barrel; introducing a valve gate through said aperture into said barrel, and adjusting the positions of said port rings until the faces thereof are positioned to register with opposite faces of said gate; fixing the thus located positions of the port rings and tube members in said barrel by welding, and sealing each of said members around its periphery to the annular wall of said barrel.

LELAND G. PLANT.

CERTIFICATE OF CORRECTION.

Patent No. 2,034,418. March 17, 1936.

LELAND G. PLANT.

It is hereby certified that error appears in the printed specification of the above numbered patent requiring correction as follows: Page 9, first column, line 31, claim 9, for the word "forcing" read forging; and that the said Letters Patent should be read with this correction therein that the same may conform to the record of the case in the Patent Office.

Signed and sealed this 28th day of April, A. D. 1936.

(Seal)

Leslie Frazer

Acting Commissioner of Patents.